(12) United States Patent
Jaradi et al.

(10) Patent No.: US 9,399,441 B2
(45) Date of Patent: Jul. 26, 2016

(54) SHAPE ADAPTIVE PASSENGER AIRBAG

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); James Chih Cheng, Troy, MI (US); Raed Essa EL-Jawahri, Northville, MI (US); Jialiang Le, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/224,573

(22) Filed: Mar. 25, 2014

(65) Prior Publication Data

US 2015/0274116 A1     Oct. 1, 2015

(51) Int. Cl.
| | |
|---|---|
| *B60R 21/2338* | (2011.01) |
| *B60R 21/16* | (2006.01) |
| *B60R 21/0136* | (2006.01) |
| *B60R 21/263* | (2011.01) |
| *B60R 21/2342* | (2011.01) |
| *B60R 21/264* | (2006.01) |
| *B60R 21/00* | (2006.01) |
| *B60R 21/01* | (2006.01) |

(52) U.S. Cl.
CPC ......... *B60R 21/2338* (2013.01); *B60R 21/0136* (2013.01); *B60R 21/263* (2013.01); *B60R 21/2342* (2013.01); *B60R 2021/0009* (2013.01); *B60R 2021/0048* (2013.01); *B60R 2021/01013* (2013.01); *B60R 2021/23384* (2013.01); *B60R 2021/2648* (2013.01)

(58) Field of Classification Search
CPC ................ B60R 21/2338; B60R 2021/23382; B60R 2021/23384; B60R 2021/23316; B60R 21/01516; B60R 21/2165; B60R 21/36; B60R 2021/01013; B60R 21/0136; B60R 2021/01211; B60R 2021/0023; B60R 21/16; B60R 21/23; B60R 2021/0009; B60R 21/232
See application file for complete search history.

(56) References Cited

U.S. PATENT DOCUMENTS

| | | | | |
|---|---|---|---|---|
| 5,608,628 | A * | 3/1997 | Drexler | B60R 21/0132 180/282 |
| 5,997,037 | A * | 12/1999 | Hill et al. | 280/743.2 |
| 6,036,224 | A * | 3/2000 | Wachter | B60R 21/0132 180/282 |

(Continued)

FOREIGN PATENT DOCUMENTS

| | | |
|---|---|---|
| DE | 102007032763 | 1/2008 |
| KR | 20060098606 | 9/2006 |
| KR | 20120043551 | 5/2012 |

*Primary Examiner* — Jerrah Edwards
*Assistant Examiner* — Demetra Smith-Stewart
(74) *Attorney, Agent, or Firm* — Frank A. MacKenzie; Bejin Bieneman PLC

(57) ABSTRACT

A vehicle airbag system comprising an airbag. The airbag may include at least one tether attached to first and second walls of the airbag, wherein each tether includes a tear seam configured to detach when the airbag is inflated with a pressure higher than a predetermined pressure. The airbag may include at least a first tether and a second tether, each tether attached to first and second walls of the airbag, wherein the first tether includes a tear seam configured to detach when the airbag is inflated with a pressure higher than a predetermined pressure. The system may further comprise a controller that may be used for determining whether to inflate an airbag with one of a high pressure and a low pressure depending on whether a detected impact is oblique.

18 Claims, 9 Drawing Sheets

(56) References Cited

U.S. PATENT DOCUMENTS

| | | | |
|---|---|---|---|
| 6,142,518 A * | 11/2000 | Butt | B60R 21/26 280/736 |
| 6,276,716 B1 * | 8/2001 | Kato | B60R 21/233 280/743.2 |
| 6,439,606 B2 * | 8/2002 | Okada et al. | 280/743.1 |
| 6,736,426 B2 | 5/2004 | Winters et al. | |
| 7,021,657 B2 | 4/2006 | Kassman et al. | |
| 7,377,546 B2 * | 5/2008 | Fischer et al. | 280/739 |
| 7,854,448 B2 * | 12/2010 | Gloeckler et al. | 280/730.2 |
| 7,922,197 B2 * | 4/2011 | Fukawatase et al. | 280/739 |
| 8,157,291 B2 * | 4/2012 | Mayer et al. | 280/735 |
| 8,226,119 B2 | 7/2012 | Dong et al. | |
| 8,636,301 B1 * | 1/2014 | Wang et al. | 280/730.2 |
| 2005/0057030 A1 * | 3/2005 | Fischer | B60R 21/2338 280/735 |
| 2009/0121460 A1 * | 5/2009 | Abe et al. | 280/728.3 |
| 2009/0224519 A1 * | 9/2009 | Fukawatase et al. | 280/736 |
| 2011/0042926 A1 * | 2/2011 | Mayer | B60R 21/0134 280/735 |
| 2012/0074677 A1 * | 3/2012 | Hiruta et al. | 280/739 |
| 2012/0217731 A1 * | 8/2012 | Baba et al. | 280/730.2 |
| 2013/0200603 A1 * | 8/2013 | Bergenheim et al. | 280/762 |
| 2014/0239619 A1 * | 8/2014 | Fukawatase | B60R 21/232 280/730.2 |
| 2015/0035262 A1 * | 2/2015 | Fukushima | B60R 21/233 280/729 |
| 2015/0258958 A1 * | 9/2015 | Belwafa | B60R 21/233 280/729 |

* cited by examiner

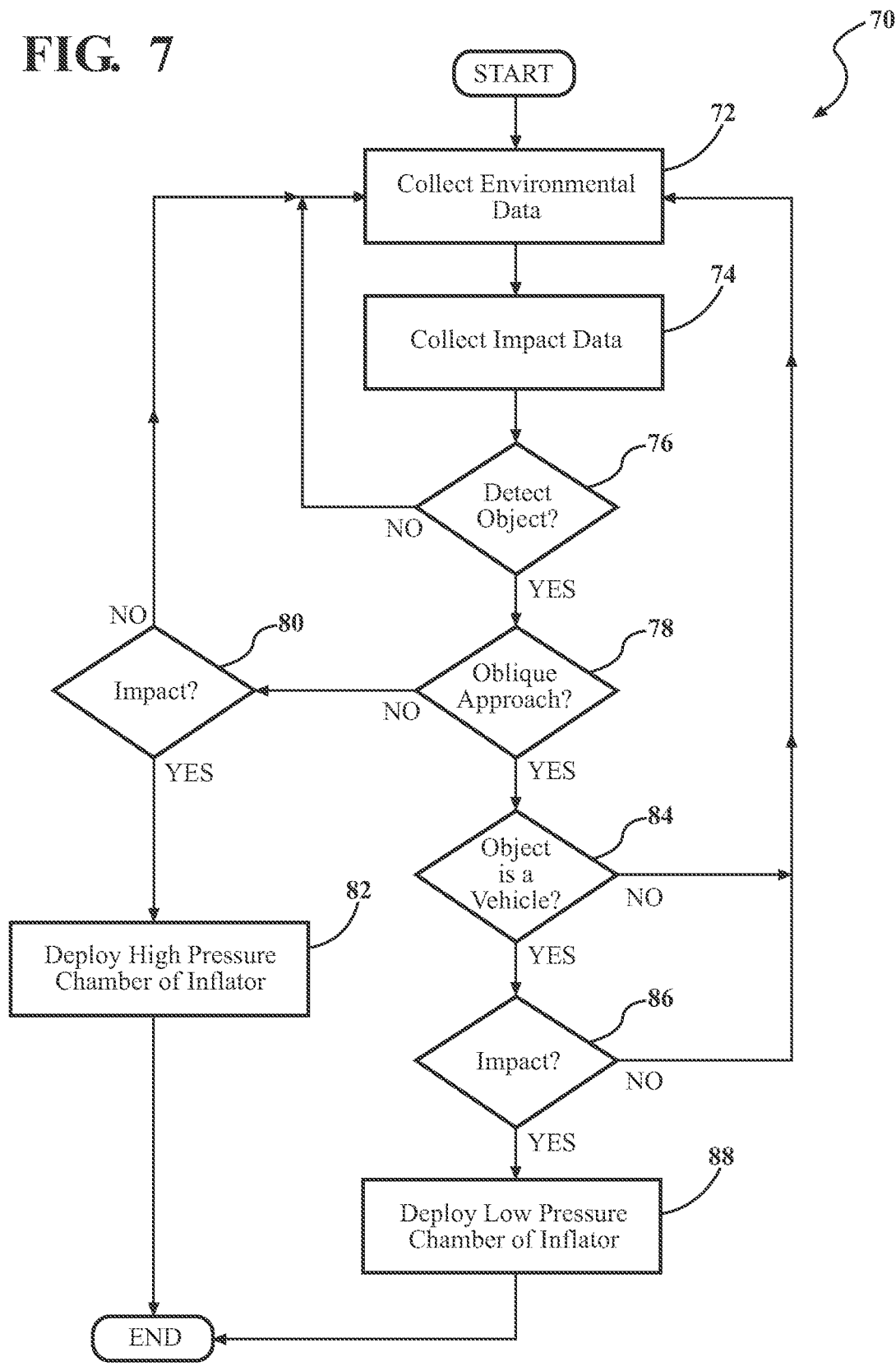

SHAPE ADAPTIVE PASSENGER AIRBAG

BACKGROUND

A potential cause of head injuries in vehicle collisions, particularly when a collision includes an oblique impact, is a rotation of a vehicle occupant's head. For example, vehicles traveling in opposite directions may collide at an angle, striking each other on a driver's side of a target vehicle. In this scenario, an occupant in a passenger-side seat of the target vehicle may experience head rotation, that consequently may induce head injury, as the occupant's head strikes a passenger airbag and rolls toward the driver's side of the vehicle. Present passenger airbags may not be problematic with head rotation in a direct head-on collision. However, present passenger airbags have deficiencies with respect to their ability to minimize head rotation and head injury in oblique collisions.

DRAWINGS

Figure 6A:
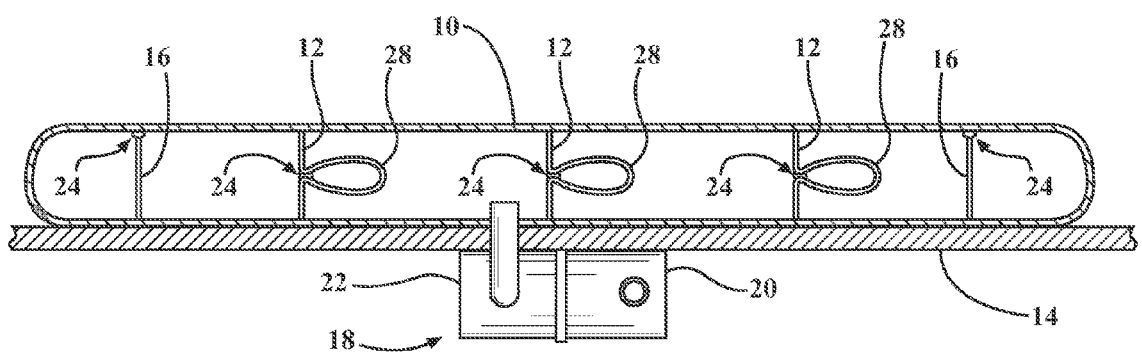
Figure 6B:
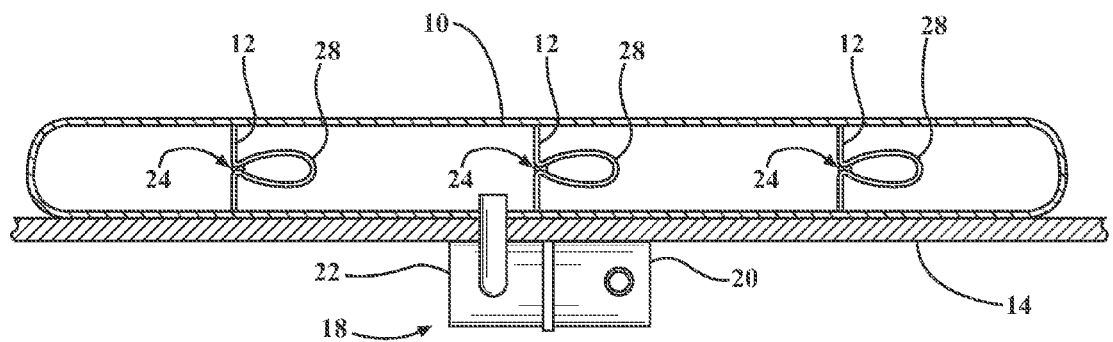
Figure 6C:
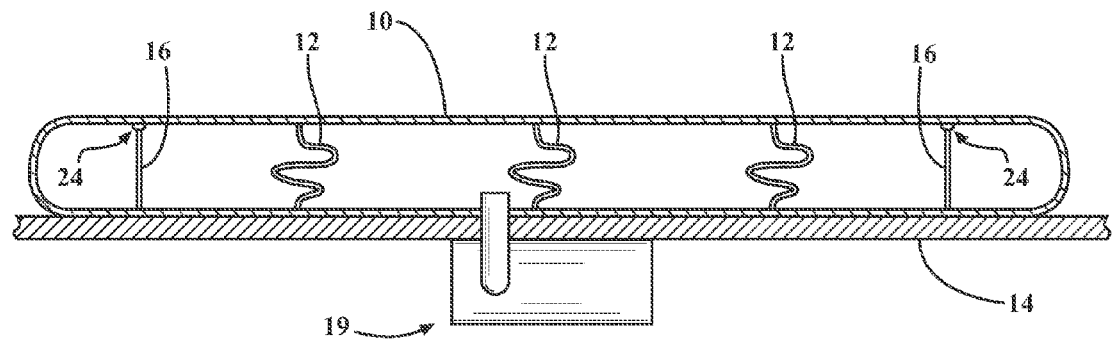

FIGS. 6A, 6B, and 6C are top cross-sectional views of an exemplary passenger airbag deployed for an oblique impact, along with an inflator, and a vehicle instrument panel.

Figure 2:
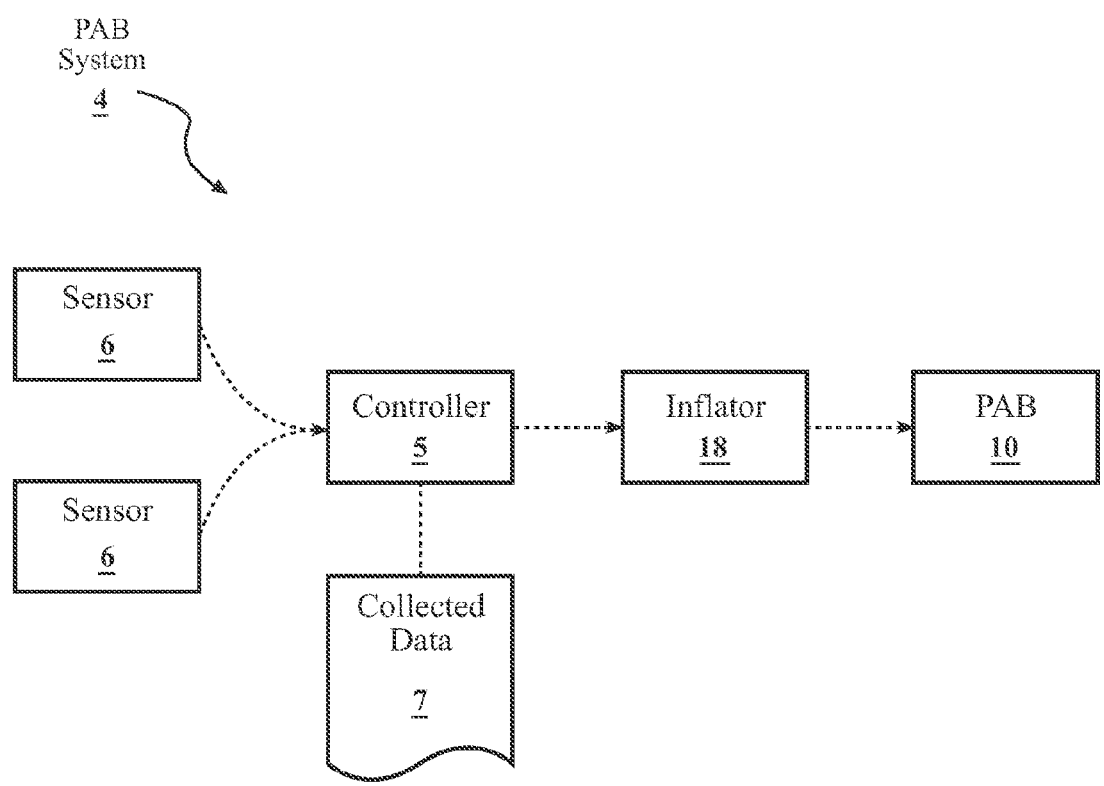
FIG. 2 is a block diagram of a passenger airbag (PAB) system.

FIG. 7 is a diagram of an exemplary process for deploying a passenger airbag in the context of the passenger airbag system of FIG. 2.

Figure 8:
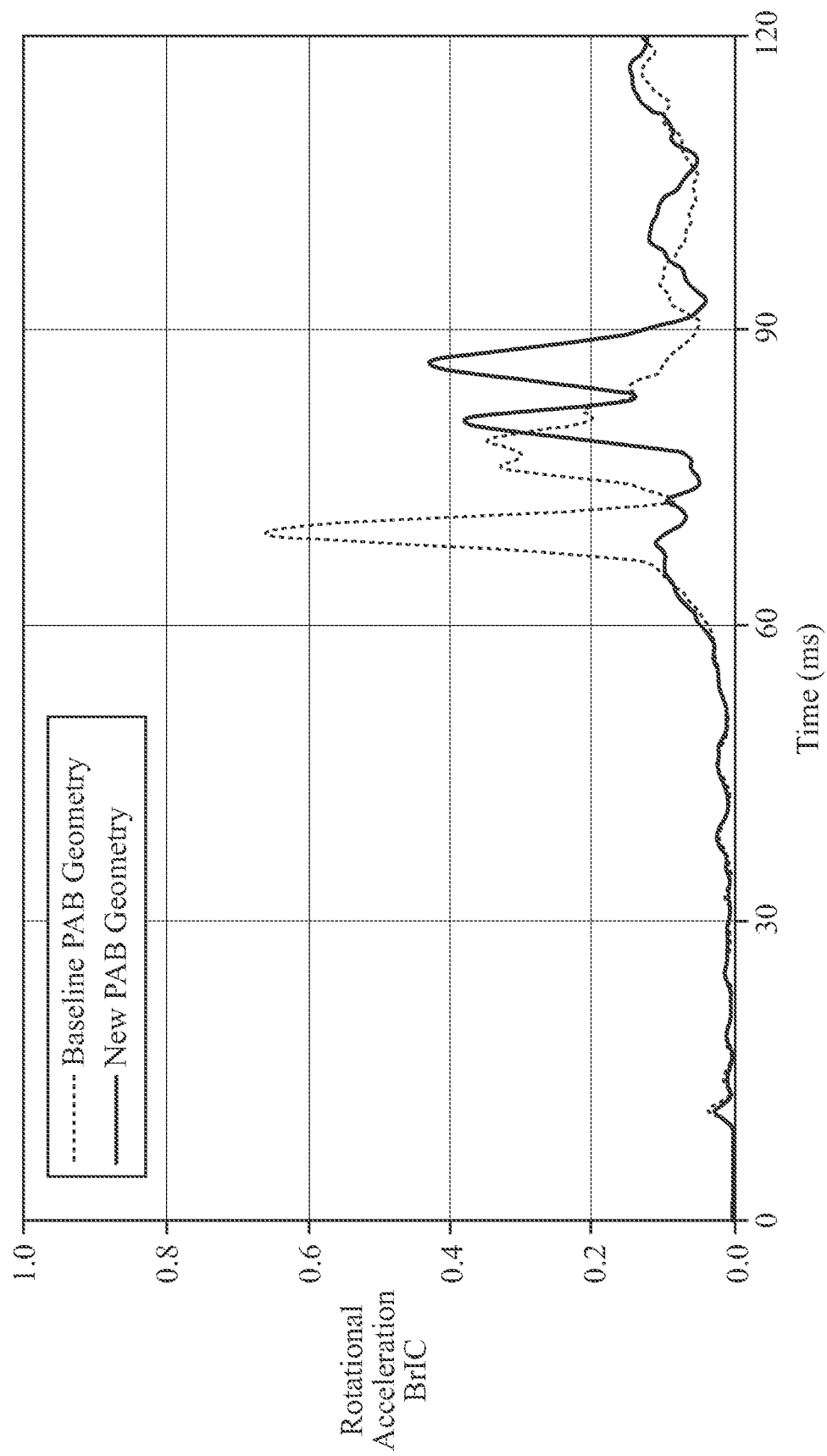

FIG. 8 is a graph showing improved acceleration Brain Injury Criterion (BrIC) scores achieved in a simulation of the passenger airbag system of FIG. 2.

Figure 9:
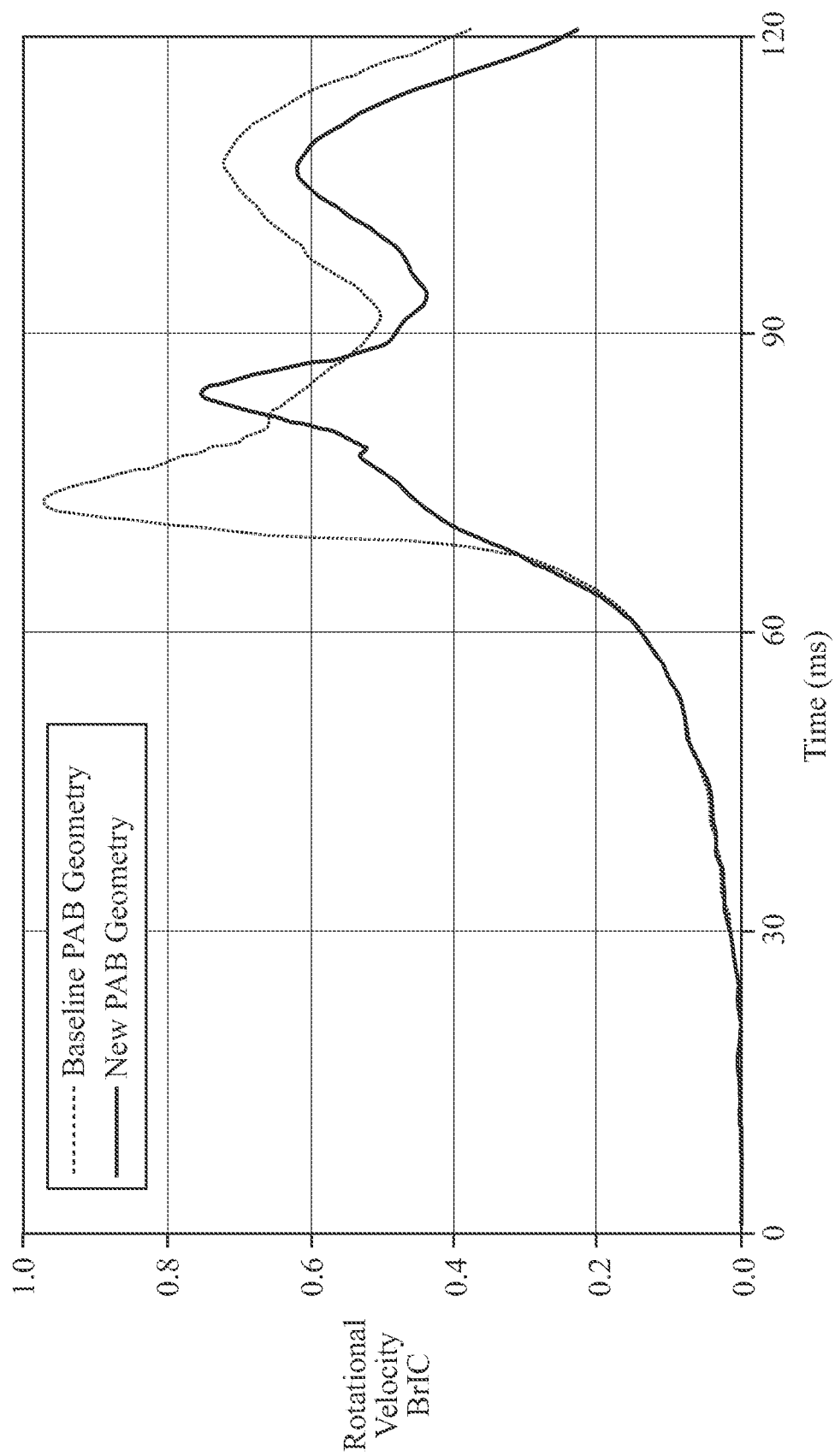

FIG. 9 is a graph showing improved rotational velocity Brain Injury Criterion (BrIC) scores achieved in a simulation of the passenger airbag system of FIG. 2.

DETAILED DESCRIPTION

Figure 1:
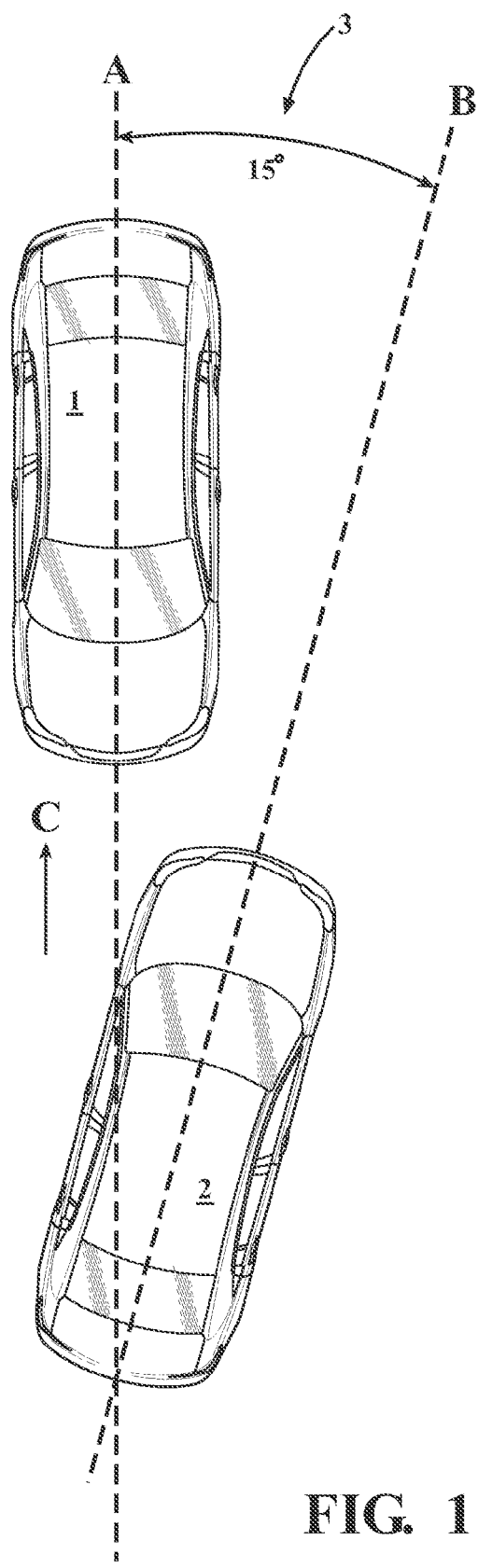
FIG. 1 is a block diagram of first and second vehicles on an oblique impact collision course.

FIG. 1 is a block diagram of first and second vehicles 1, 2 on an oblique impact collision course. As illustrated in FIG. 1, the vehicles 1, 2 will strike each other at an angle 3, defined by longitudinal axes A, B of the vehicles 1, 2, respectively. In the example of FIG. 1, the angle 3 is 15 degrees, which is an angle used in an oblique impact test mode of the National Highway Transportation and Safety Administration (NHTSA). Accordingly, when the vehicle 2 strikes the vehicle 1, a passenger seated in the vehicle 2 will be moved in a direction indicated by the arrow C, i.e., in a direction generally parallel to, or almost parallel to, e.g., within one degree of, the Axis A of the vehicle 1, i.e., at the angle 3, e.g., 15 degrees, between the axis B of the vehicle 2 and the Axis A of the vehicle 1. In this scenario, a passenger seated in the vehicle 2 may experience head rotation, and more severe head injury that would have been experienced in a head-on collision, e.g., measured by a Brain Injury Criterion (BrIC) score, such as is known.

FIG. 2 is a block diagram of a passenger airbag (PAB) system 4. An airbag controller 5, which may include a processor and a memory or other computer-readable medium storing instructions executable by the processor, including instructions for determining when and how to deploy a passenger airbag 10 as disclosed herein. Sensors 6 may collect and provide to the controller 5 various data 7, e.g., via a controller area network (CAN) bus or some other networking technology in a vehicle. Based on evaluations of the data 7, the controller 5 may trigger deployment of the PAB 10, e.g., upon detection of a collision. For example, the PAB 10 may be deployed by the controller 5 causing an igniter or the like to be triggered, which in turn causes an inflator 18 to provide the PAB 10 with gas, thereby inflating the PAB 10

Further, the controller 5 may be configured to control a pressure at which the inflator 18 provides gas to the PAB 10. For example, as discussed below, e.g., with respect to FIGS. 5A, 5B, 6A, and 6B, the inflator 18 may be a dual-chamber inflator, wherein the controller 5 may be configured to determine whether, upon detecting an impact or collision, to trigger a high-pressure chamber 20 or a low-pressure chamber 22 of the inflator 18. Moreover, the PAB 10 may be configured with tethers 12, 16 that provide for different shapes and/or volumes of the airbag 10 at different respective inflation pressures. That is, the tethers 12, 16 are generally pressure-sensitive, i.e., sensitive to a pressure with which gas is provided to the airbag 10, e.g., by the inflator 18.

Figure 3A:
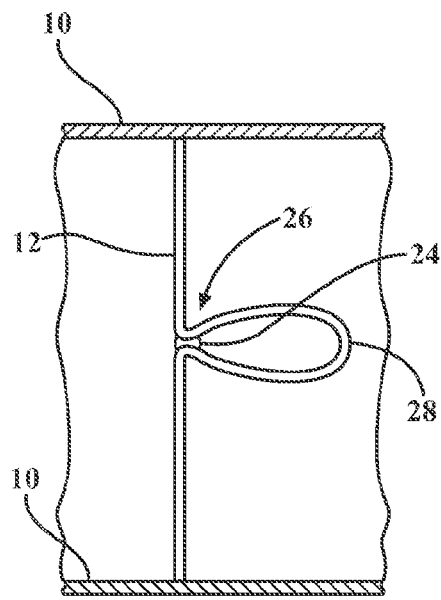
FIGS. 3A and 3B are top cross-sectional views of a portion of a PAB including an adaptive length tether.
Figure 3B:
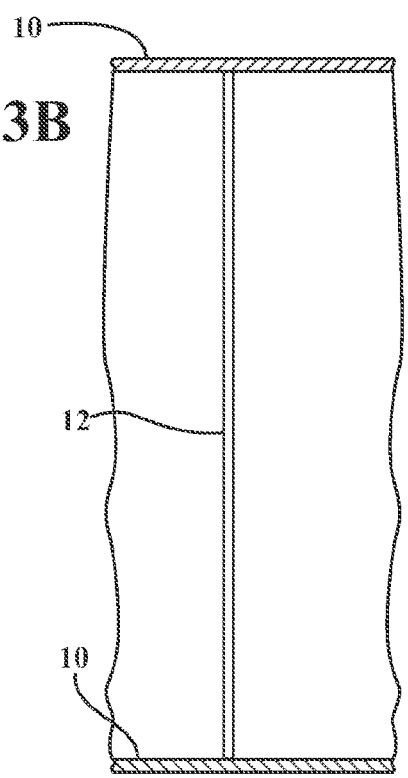

For example, FIGS. 3A and 3B are top cross-sectional views of a portion of a PAB 10 including an adaptive length tether 12. Respective ends of the tether 12 are attached, e.g., sewn, to sides of the airbag 10. Further, as is seen in FIG. 3A, the tether 12 includes a tear seam 24. First and second locations 26 of the tether 12 are stitched together, or otherwise attached to one another, at the tear seam 24, the stitching or attachment being configured to break at a predetermined pressure, e.g., a pressure lower than a pressure provided by a high-pressure chamber 20 of the inflator 18, but higher than a pressure provided by a low-pressure chamber 22 of the inflator 18. The locations 26 are selected such that, when the airbag 10 is inflated by the low-pressure chamber 22, the tether 12 restricts an inflated or deployed width of the airbag 10 to a length of the tether 12 less a slack portion 28 thereof, the slack portion 28 being a portion of the tether 12 generally between the locations 26. As can be seen in FIG. 3B, when the airbag 10 is inflated by the high-pressure chamber 20, the width of the airbag 10 is generally determined at least partly by a length of the tether 12, i.e., the slack portion 28 is not present because the tear seam 26 breaks upon deployment of the high-pressure chamber 20.

Figure 4A:
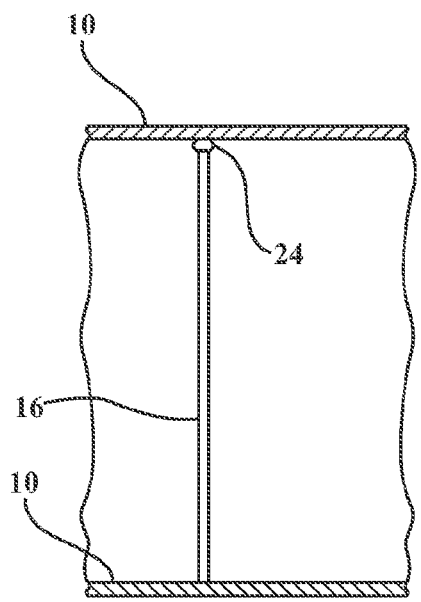
FIGS. 4A and 4B are top cross-sectional views of a portion of a PAB including breakable tether.
Figure 4B:
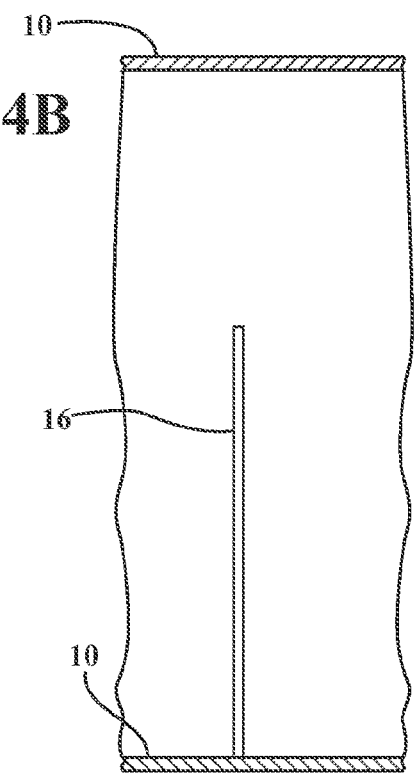

FIGS. 4A and 4B are top cross-sectional views of a portion of a PAB 10 including a breakable tether 16. As seen in FIG. 4A, respective ends of the tether 16 are generally attached, e.g. sewn, to sides of the PAB 10. Further, a tear seam 24 is located at one end of the tether 16, i.e., at a point of attachment of the tether 16 to a wall of the PAB 10. FIG. 4a represents a state of the airbag 10 when inflated by the low-pressure chamber 22, i.e., a width of the airbag 10 is determined at least partly by a length of the tether 16. As seen in FIG. 4B, however, when the PAB 10 is inflated by the high-pressure chamber 20, the breakable tether 16 does not govern, even partly, a width or shape of the PAB 10, because the tether 16 has separated from the wall of the PAB 10 at the tear seam 24.

Figure 5A:
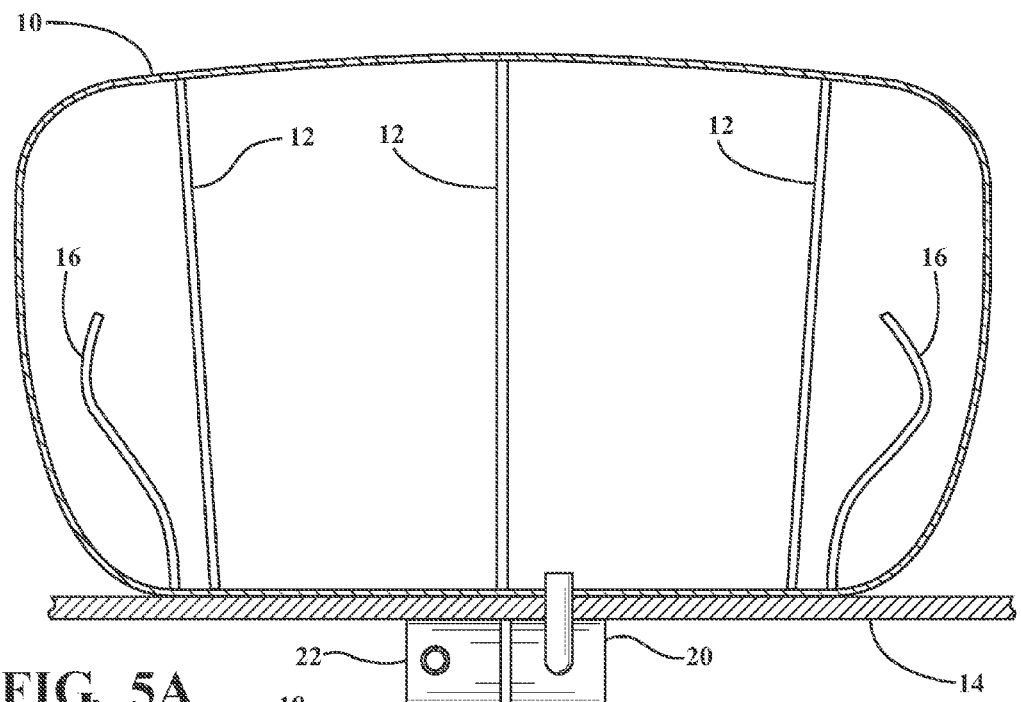
FIGS. 5A, 5B and 5C are top cross-sectional views of exemplary passenger airbags deployed for a non-oblique impact, along with an inflator, and a vehicle instrument panel.
Figure 5B:
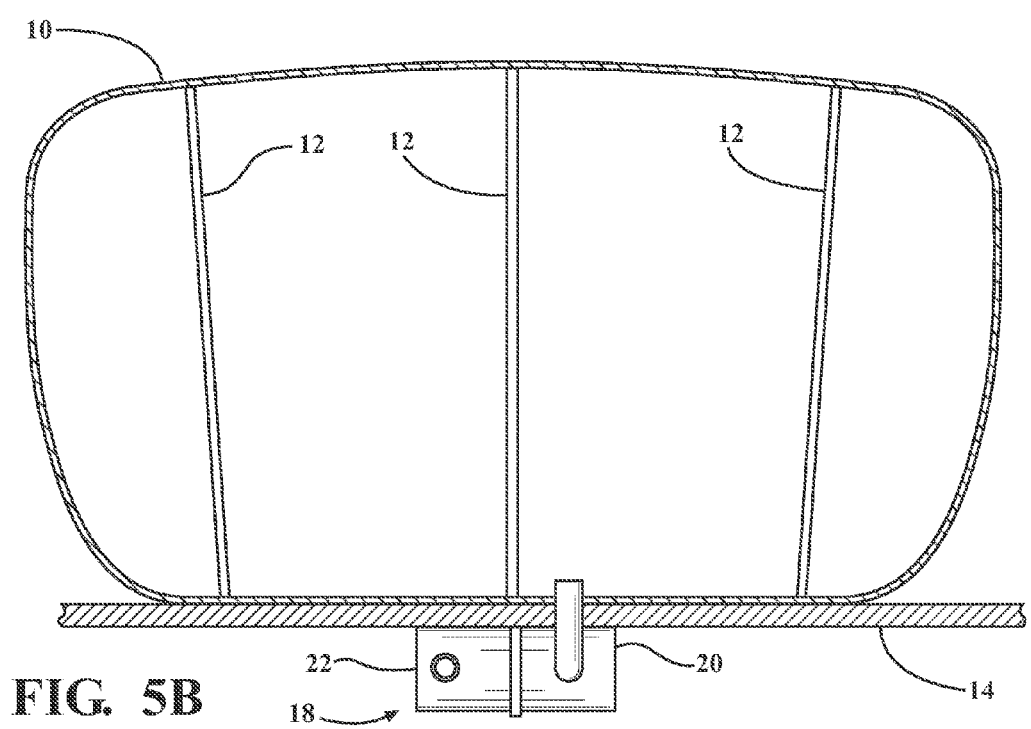

The shape-adaptive PAB 10 of the present disclosure may include one or more, and generally a plurality, of tethers 12, 16, e.g., as illustrated in FIGS. 5, 6, discussed below. Further, although the PAB 10 is shown in the figures as including both adaptive length tethers 12 and breakable tethers 16, it is possible that only one type of tether 12 or 16 could be included in the PAB 10. In general, as mentioned above and explained in further detail below, the tethers 12, 16, in combination with the dual-chamber inflator 18, are used to govern a shape of the PAB 10 upon deployment in different crash situations. For example, FIGS. 5A, 5B show the PAB 10 in a shape appropriate for New Car Assessment Program (NCAP) or object deformable barrier (ODB) modes. FIG. 6A, 6B show the PAB 10 in a shape appropriate for an oblique impact (OI) mode.

FIG. 5A is a top cross-sectional view of an exemplary passenger airbag 10 deployed for a non-oblique impact, along with an inflator 18, and a vehicle instrument panel 14. As seen in FIG. 5A, the airbag 10 has been inflated by the high-pressure chamber 20 of the dual-chamber inflator 18. A width and/or shape of the airbag 10 is governed by adaptive length tethers 12, extended to their full length, i.e., a tear seam 24 such as is shown in FIG. 3A, has been broken. Further, breakable tethers 16 are seen attached to the airbag 10 at only one end when the high-pressure chamber 20 has been used to inflate the airbag 10, i.e., the other end of each tether 16 will have been detached from a wall of the airbag 10 at a tear seam 24. Accordingly, the airbag 10 upon inflation by the high-pressure chamber 20 has a shape determined by a length or lengths of the adaptive length tethers 12.

FIG. 6A is a top cross-sectional view of the exemplary passenger airbag 10 of FIG. 5A deployed for an oblique impact, along with an inflator 18, and a vehicle instrument panel 14. As illustrated in FIG. 6A, the low-pressure chamber 22 of the inflator 18 may be used in combination with an adaptive-length tether 12 having a length configured according to a tear seam 24 shortening the tether 12 at locations 26, as shown in FIG. 3B, or according to a length of a breakable tether 16 length, where the tether 16 is affixed to the airbag 10 at one end by a tear seam 24, as shown in FIG. 4A. In either case, the tear seam 24, as discussed above, is configured not to break or detach at an inflation pressure provided by the low-pressure chamber 22. Accordingly, the airbag 10 upon inflation by the low-pressure chamber 22 has a shape determined by a length or lengths of tethers 12, 16 determined by an unbroken or undetached tear seam 24. The shape of the PAB 10 shown in FIG. 6 is generally appropriate for an oblique impact mode, and is sometimes referred to as a "pancake" shape of the PAB 10. Advantageously, the relatively flat, oblong, or pancake shape of the PAB 10 when inflated using the low-pressure chamber 22 avoids early contact of a vehicle passenger's head with the PAB 10 in a collision, thereby mitigating a rotation rate of the passenger's head.

FIG. 5B is a top cross-sectional view of an exemplary passenger airbag 10 deployed for a non-oblique impact, along with an inflator 18, and a vehicle instrument panel 14. The exemplary PAB 10 of FIG. 5B differs from the exemplary PAB 10 of FIG. 5A in that tethers 16 are seen in FIG. 5A, but not FIG. 5B. Accordingly, in the example of FIG. 5B, a shape of the PAB 10 is governed by adaptive length tethers 12, without breakable tethers 16. For example, FIG. 5B shows the airbag 10 including adaptive length tethers 12, but not breakable tethers 16, after inflation by the high-pressure chamber 20.

FIG. 6B is a top cross-sectional view of the exemplary passenger airbag 10 of FIG. 5B deployed for an oblique impact, along with an inflator 18, and a vehicle instrument panel 14. The low-pressure chamber 22 of the inflator 18 has been used adaptive length tethers 12 having a length shortened by slack portions 28 to govern a shape of the airbag 10. In contrast to the airbag 10 of the FIGS. 5A, 5B, breakable tethers 16 are omitted. Accordingly, in the airbag 10 of FIG. 6B, in an oblique impact mode, the shape of the airbag 10 is governed only by tethers 12 in a shortened state.

Figure 5C:
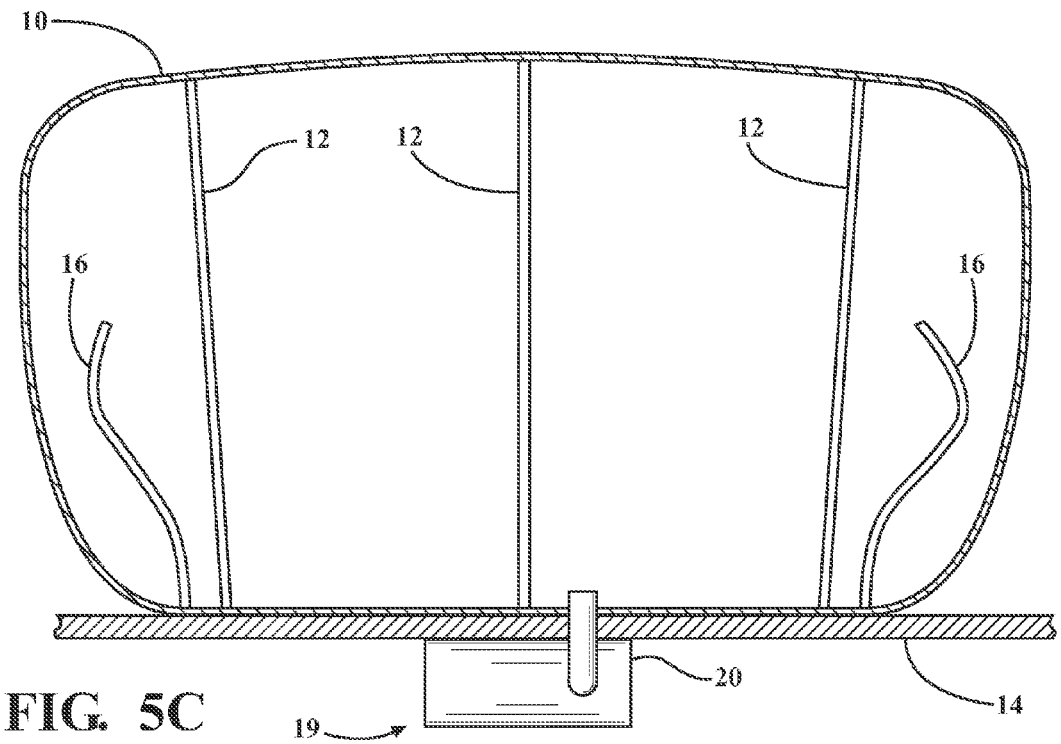

FIG. 5C is a top cross-sectional view of a further exemplary passenger airbag 10 deployed in a non-oblique impact mode the context of an instrument panel 14 and using a single-chamber inflator 19, instead of the dual-chamber inflator 18. FIG. 6C is a top cross-sectional view of a further exemplary passenger airbag 10 deployed in an oblique impact mode the context of an instrument panel 14 and using the single-chamber inflator 19. The single-chamber inflator 19 is equipped with both low output and high output loads, i.e., a single chamber of the inflator 19 can provide high or low pressure. Further, a tear seam 24 is provided with respect to breakable tethers 16, but omitted with respect to the tethers 12. Accordingly, in an oblique impact mode, i.e., where a low-pressure mode of the inflator 19 has been used, as shown in FIG. 6C, a shape of the airbag 10 is determined by a length of the breakable tethers 16, i.e., the tear seams 24 of the tethers 16 are not broken or detached from the airbag 10. The tethers 12, in contrast, have a greater length than a length of the tethers 16, and therefore exhibit slack in an oblique impact mode where the breakable tethers 16 govern the shape of the airbag 10. However, as seen in FIG. 5C, in a non-oblique impact mode, the breakable tethers 16 float free, and a shape of the airbag 10 is governed by the adaptive length tethers 12.

FIG. 7 is a diagram of an exemplary process 70 for deploying a passenger airbag 10 in the context of the passenger airbag system 4 of FIG. 2. As described herein, the process 70 is generally carried out according to instructions stored in a memory or the like of an airbag controller 5 in a vehicle.

The process 70 begins in a block 72, in which the controller 5 collects environmental data 7 from sensors 6. For example, environmental sensors 6 may include cameras, lidar, radar, etc. that provide data 7 concerning surroundings of a vehicle to the controller 5. Based on environmental data 7, the controller 5 may determine a presence and/or location of an object or objects proximate to a vehicle, e.g., within 1, 5, 10, 15, 20, etc., meters.

Next, in a block 74, the controller 5 collects impacted data 7 from sensors 6. For example, impact sensors 6 may include accelerometers or the like for identifying an impact or collision event of a vehicle.

Next, in a block 76, the controller 5 analyzes environmental data 7 collected as described above with respect to the block 72, to determine whether an object proximate to the vehicle, generally an object approaching the vehicle, has been detected. In this context, "approaching" could mean that an object is moving toward the vehicle, that the vehicle is moving toward a stationary object, or that and object and the vehicle are each moving, but that the object is approaching the vehicle relative to motion of the vehicle, e.g., the object is approaching a front of the vehicle and/or moving in a same or similar direction as the vehicle but at a different speed such that there is a relative approach between the object and the vehicle. For example, image, radar, lidar, etc., data 7 may be analyzed to indicate a presence and/or location of an object such as a pedestrian, another vehicle, a tree, a guard rail, etc., within a predetermined distance of a vehicle. If an object is detected, then a block 78 is executed next. Otherwise, the process 70 returns to the block 72.

In the block 78, the controller 5 determines whether the object determined in the block 76 is approaching the vehicle obliquely. For example, an oblique approach may be defined as described above with respect to FIG. 1, e.g., an approach that would lead to an impact of the object with the vehicle at an angle of 15 degrees. If the approach is not oblique, then the process 70 proceeds to a block 80. If the approach of the object is oblique, then the process 70 proceeds to a block 84.

In the block 80, which may follow the block 78, the controller 5 analyzes impact data 7 collected as described above with respect to the block 74, and determines whether an impact has been detected. If not, the process 70 returns to the block 72. Otherwise, a block 82 is executed next.

In the block 82, following the block 80, the controller 5 causes actuation of the inflator 18, and specifically actuation of the high-pressure chamber 20 of the inflator 18. Accordingly, the PAB 10 included in the airbag system 4 will be deployed for a non-oblique impact, e.g., as shown in FIG. 5. Following the block 82, the process 70 ends.

In the block 84, which may follow the block 78, the controller 5 determines whether a detected object that has been determined to be approaching at an oblique angle, is another vehicle. If not, the process 70 returns to the block 72. Otherwise, a block 86 is executed next.

In the block 86, which may follow the block 78, the controller 5 analyzes impact data 7 collected as described above with respect to the block 74, and determines whether an impact has been detected. If not, the process 70 returns to the block 72. Otherwise, a block 88 is executed next.

In the block 88, following the block 84, the controller 5 causes actuation of the inflator 18, and specifically actuation of the low-pressure chamber 22 of the inflator 18. Accordingly, the PAB 10 included in the airbag system 4 will be deployed for an oblique impact, e.g., as shown in FIG. 6. Following the block 86, the process 70 ends.

FIG. 8 is a graph showing improved acceleration Brain Injury Criterion (BrIC) scores achieved according to a finite element analysis simulation of the passenger airbag system of FIG. 2. As seen in FIG. 8, rotational acceleration BrIC scores are considerably lower in a simulated impact using the PAB 10 of the system 4, as opposed to conventional passenger airbags. In general, simulations have shown that rotational acceleration BrIC scores a reduced by approximately 35 percent using the presently-disclosed system 4, a significant improvement.

FIG. 9 is a graph showing improved rotational velocity BrIC scores achieved according to a finite element analysis simulation of the passenger airbag system of FIG. 2. As seen in FIG. 8, rotational velocity BrIC scores are considerably lower in a simulated impact using the PAB 10 of the system 4, as opposed to conventional passenger airbags. In general, simulations have shown that rotational acceleration BrIC scores a reduced by approximately 23 percent using the presently-disclosed system 4, a significant improvement. Moreover, combining the information provided in FIGS. 8 and 9, it has been found that overall, the presently-disclosed system 4 reduces overall BrIC scores by 28 percent.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A vehicle airbag system, comprising:
   an airbag that includes at least one tether attached to first and second walls of the airbag, wherein each tether includes a tear seam detachable when the airbag is inflated with a pressure higher than a predetermined pressure; and
   an airbag controller that is configured to determine whether an impact is one of an oblique impact and a non-oblique impact, and to determine a pressure for inflating the airbag based on the determination.

2. The airbag system of claim 1, wherein the tear seam attaches two locations in the at least one tether.

3. The airbag system of claim 1, wherein the tear seam is located at an end of the at least one tether.

4. The airbag system of claim 1, further comprising an inflator that includes a first chamber and a second chamber,
   the first chamber being configured to inflate the airbag at a first pressure that is lower than the predetermined pressure,
   the second chamber being configured to inflate the airbag at a second pressure that is higher than the predetermined pressure.

5. The airbag system of claim 1, further comprising a single-chamber inflator having a low pressure mode and a high pressure mode; wherein,
   in the low pressure mode the inflator inflates the airbag at a pressure that is lower than the predetermined pressure, and
   in the high pressure mode the inflator inflates the airbag at a pressure that is higher than the predetermined pressure.

6. The airbag system of claim 1, further comprising triggering an inflator for the airbag, wherein the inflator includes a low pressure mode and a high pressure mode; wherein,
   in the low pressure mode the inflator inflates the airbag at a pressure that is lower than the predetermined pressure, and
   in the high pressure mode the inflator inflates the airbag at a pressure that is higher than the predetermined pressure.

7. A vehicle airbag system, comprising:
   an airbag that includes at least a first tether and a second tether, each tether attached to first and second walls of the airbag, wherein the first tether includes a tear seam configured to detach when the airbag is inflated with a pressure higher than a predetermined pressure; and
   an airbag controller that is configured to determine whether an impact is one of an oblique impact and a non-oblique impact, and to determine a pressure for inflating the airbag based on the determination.

8. The airbag system of claim 7, wherein the second tether does not include a tear seam.

9. The airbag system of claim 7, wherein the tear seam is located at an end of the first tether.

10. The airbag system of claim 7, further comprising an inflator that includes a first chamber and a second chamber,
    the first chamber being configured to inflate the airbag at a first pressure that is lower than the predetermined pressure,
    the second chamber being configured to inflate the airbag at a second pressure that is higher than the predetermined pressure.

11. The airbag system of claim 7, further comprising a single-chamber inflator having a low pressure mode and a high pressure mode; wherein, in the low pressure mode the inflator inflates the airbag at a pressure that is lower than the predetermined pressure, and in the high pressure mode the inflator inflates the airbag at a pressure that is higher than the predetermined pressure.

12. A method implemented in a vehicle airbag controller that includes a processor and a memory, comprising:

collecting data concerning an object approaching the vehicle;

using the data to determine that the object has impacted the vehicle and whether the impact is oblique;

determining whether to inflate an airbag with one of a high pressure and a low pressure depending on whether the impact is oblique.

13. The method of claim 12, wherein the airbag includes at least a first tether and a second tether, each tether attached to first and second walls of the passenger airbag, wherein the first tether includes a tear seam configured to detach when the airbag is inflated with a pressure higher than a predetermined pressure.

14. The method of claim 13, wherein the second tether does not include a tear seam, and the tear seam is located at an end of the at least one tether.

15. The method of claim 12, wherein the airbag includes at least one tether attached to first and second walls of the airbag, wherein each tether includes a tear seam configured to detach when the airbag is inflated with a pressure higher than a predetermined pressure.

16. The method of claim 15, wherein the tear seam attaches two locations in the at least one tether.

17. The method of claim 15, wherein the tear seam is located at an end of the at least one tether.

18. The method of claim 12, further comprising triggering an inflator for the airbag, wherein the inflator includes a first chamber and a second chamber, the first chamber being configured to inflate the airbag at a first pressure that is lower than the predetermined pressure, the second chamber being configured to inflate the airbag at a second pressure that is higher than the predetermined pressure.

* * * * *